US000001251H

United States Statutory Invention Registration [19]

[11] Reg. Number: H1251

Southwick

[43] Published: Nov. 2, 1993

[54] ACRYLIC-CONTAINING DIENE COPOLYMERS IN ADHESIVES, SEALANTS AND COATINGS

[75] Inventor: Jeffrey G. Southwick, Houston, Tex.

[73] Assignee: Shell Oil Company, Houston, Tex.

[21] Appl. No.: 876,719

[22] Filed: Apr. 24, 1992

[51] Int. Cl.[5] ..... C08L 1/00
[52] U.S. Cl. ..... 524/272
[58] Field of Search ..... 524/272; 525/94, 95

[56] References Cited

U.S. PATENT DOCUMENTS

| | | | |
|---|---|---|---|
| 4,284,541 | 8/1981 | Takeda et al. | 524/272 |
| 4,994,508 | 2/1991 | Shiraki et al. | 524/272 |
| 5,002,676 | 3/1991 | Willis et al. | 252/56 |

FOREIGN PATENT DOCUMENTS 0298667 1/1989 European Pat. Off. .

*Primary Examiner*—Robert L. Stoll
*Assistant Examiner*—Joseph D. Anthony
*Attorney, Agent, or Firm*—Don F. Haas

[57] ABSTRACT

A hot melt adhesive composition comprising a tackifying resin and a polymer which comprises at least one conjugated diolefin and at least one acrylic monomer such as an alkyl methacrylate.

20 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ACRYLIC-CONTAINING DIENE COPOLYMERS IN ADHESIVES, SEALANTS AND COATINGS

BACKGROUND OF THE INVENTION

This invention relates to a novel diene copolymer composition for use in hot melt adhesives. More particularly, it relates to diene block copolymer adhesive compositions containing acrylic monomers.

It is known that a block copolymer can be obtained by an anionic copolymerization of conjugated dienes or such dienes and an alkenyl arene compound by using an organic alkali metal initiator. For example, block copolymers have been produced which comprise primarily those having a general structure A—B and A—B—A wherein the polymer blocks A comprise thermoplastic polymer blocks of alkenyl arenes such as polystyrene, while block B is a polymer block of a conjugated diene such as polybutadiene or polyisoprene. They may be linear, radial, star, tapered and/or asymmetric and hydrogenated or unhydrogenated. The proportion of the thermoplastic blocks to the elastomeric polymer block and the relative molecular weights of each of these blocks is balanced to obtain a rubber having unique performance characteristics.

It is well known that these polymers are useful in formulating hot melt adhesives. Such polymers are especially useful in formulating hot melt adhesives that are superior in adhesion to nonpolar surfaces. Nonrubber acrylic adhesives are known to be useful for making adhesives that are superior in adhesion to polar surfaces, presumably because of favorable energetics between the polar acrylic functionality and the surface polarity. It would be advantageous to provide a hot melt adhesive composition which was based on a rubbery or elastomeric polymer but which also has superior adhesion to polar surfaces. The present invention provides such a hot melt adhesive composition.

SUMMARY OF THE INVENTION

The present invention is a hot melt adhesive composition which comprises a tackifying resin and a polymer of a conjugated diolefin which contains an acrylic monomer as part of the polymer backbone. The polymer used in the composition of the present invention is preferably comprised of at least one conjugated diolefin block and at least one acrylic monomer block with the structure

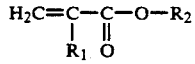

where $R_1$ is hydrogen, phenyl or an alkyl radical which is linear or branched and has from 1 to 10 carbon atoms and $R_2$ is an alkyl radical which is branched at the first carbon atom, has from 1 to 14 carbon atoms, may contain a tertiary amine or an ether linkage and may be a cyclic hydrocarbon.

These polymers are functionalized in that they contain, in the polymer backbone, acrylic, especially methacrylate, functionality. This provides the polymer with strongly reactive and interactive chemical groups. In the formula above, it is important that $R_2$ be branched at the first carbon because branching makes the monomer easier to polymerize. An example is t-butyl which has the formula:

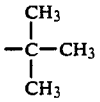

It is preferred that the acrylic monomers be alkyl methacrylates and the preferred alkyl methacrylate is tertiary butyl methacrylate. Further, it is preferred that the tackifying resin comprise from about 20 to about 400 parts by weight per 100 parts rubber (phr). The preferred structure for use in this invention is a linear styrene-isoprene-styrene-tertiary butyl methacrylate block copolymer.

DETAILED DESCRIPTION OF THE INVENTION

The polymers which may be used according to the present invention are polymers of conjugated dienes and acrylic monomers of the formula described above such as alkyl methacrylates or derivatives of alkyl methacrylates such as hydrolyzed alkyl methacrylates or anhydride derivatives thereof. Other suitable acrylic monomers include acrylates, such as t-butyl acrylate; cyclic alkyl methacrylates, such as 2,5-dimethylcyclohexyl methacrylate; and acrylates in which the alkyl group contains an ether linkage, such as tetrahydrofuran acrylate. Copolymers containing two or more conjugated dienes are useful herein. Copolymers of conjugated dienes and acrylic monomers with vinyl aromatic monomers are preferred and both random and block copolymers thereof are useful herein. The description which follows is described in terms of block copolymers of conjugated dienes, alkyl methacrylates and vinyl aromatic hydrocarbons but it is applicable also to the other polymers described in this paragraph. This means that this invention encompasses functionalized polymers which are not block copolymers but which incorporate the functionality as described below.

The present invention encompasses polymers which are both high and low in molecular weight, as well as in between. High molecular weight polymers include those up to several million molecular weight as defined by gel permeation chromatography (GPC) peak molecular weight of the main species. Low molecular weight polymers include those of only 1000 molecular weight or even less. In all cases these polymers contain both conjugated dienes and acrylic monomers (alkyl methacrylates).

The preferred base polymers of the present invention are block copolymers of conjugated dienes, acrylic monomers such as alkyl methacrylates or their derivatives (including polyacrylic acids, anhydrides or unconverted ester functional forms) and vinyl aromatic hydrocarbons. Such block copolymers may be multiblock copolymers of varying structures containing various ratios of the monomers including those containing up to about 60% by weight of vinyl aromatic hydrocarbon. At higher vinyl aromatic hydrocarbon contents, the polymers are not elastomeric and have limited utility in adhesives, sealants and coatings. Thus, multiblock copolymers may be utilized which are linear or radial, symmetric or asymmetric, and which have structures represented by the formulae, ABAC, ABC, BC, BAC, CABAC, CBC, $(BC)_nX$, $(BC)_nXB_m$, etc where A is the vinyl aromatic hydrocarbon, B is the diene, C is the acrylic monomer, X is a coupling agent and n and m are integers from 1 to 50. These are just some of the structures possible. Their finite number is not meant to limit the scope of the invention. These polymers may also occur in coupled form such as A-B-A-acrylic monomer-A B-A. This form may comprise from 15 to 50 weight percent of the polymer. It is not necessary but B can be a polymer block of a conjugated diene that has been hydrogenated. Hydrogenation of the diene is preferred to impart superior thermal stability to the adhesive.

It may be desirable to functionalize these block copolymers of methacrylate and rubber. However, the routes to acid functionalizing involve exposing the polymer to: (1) heat which eliminates isobutylene and water to form a methacrylic anhydride which then forms methacrylic acid upon exposure to water, or (2), hydrolysis of the ester group by heating (70°–90° C.) a polymer solution in the presence of an acid or acid catalyst. Both routes can degrade and/or crosslink unsaturated rubber. To circumvent this problem the rubber block must be hydrogenated. An alternate route to acid functionalization of styrene-rubber copolymers is possible by sequentially polymerizing a segment of polymethacrylate onto one end of the styrene-rubber to make an "ABC" type polymer. The acid functionality can then be made in situ during the acid wash stage of catalyst removal.

The preferred polymers for use herein are block copolymers which contain a block of vinyl aromatic hydrocarbon and a block of conjugated diene and a block of alkyl methacrylate because these polymers combine the strength and elasticity of styrenic block copolymers with a polymeric block incorporating functionality which can provide enhanced adhesion to polar surfaces.

The block copolymers may be produced by any well known block polymerization or copolymerization procedures including the well-known sequential addition of monomer techniques, incremental addition of monomer technique or coupling technique. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates. The manufacture of such polymers containing alkyl methacrylates is described in U.S. Pat. No. 5,002,676 and copending commonly assigned application Ser. No. 525,812, filed May 21, 1990, both of which are herein incorporated by reference.

Conjugated dienes which may be utilized to prepare the polymers and copolymers include those having from 4 to 8 carbon atoms and also include 1,3-butadiene,2-methyl-1,3-butadiene(isoprene),2,3-dimethyl-1,3-butadiene, 1,3-pentadiene, 1,3-hexadiene and the like. Mixtures of such conjugated dienes may also be used. The preferred conjugated dienes are 1,3-butadiene and isoprene.

Vinyl aromatic hydrocarbons which may be utilized to prepare copolymers include styrene, o-methylstyrene, p-methylstyrene, p-tert-butylstyrene, 2,4-dimethylstyrene, alpha-methylstyrene, vinylnapthalene, vinylanthracene and the like. The preferred vinyl aromatic hydrocarbon is styrene.

Alkyl methacrylates are preferred for use herein and those employed herein include methacrylates wherein the alkyl group has up to 14 carbon atoms inclusive. Derivatives of these polymers are also included herein, such as, for example, polymers with partially or completely acidified methacrylate groups, their anhydrides, their ionomers, their reaction products with alcohols and amines, and the like. Derivatives of alkyl methacrylates include methacrylic acid, methacrylic acid salts (for example, zinc, sodium and quaternary ammonium salts) and anhydrides formed between adjacent acid units by heating. It should be noted that derivatization of the methacrylate group can be carried out prior to adding the polymer to the tackifying resin or in situ after the polymer is added to the tackifying resin. The in situ reaction requires a reactive ester group such as t-butyl or 1,1-dimethyl alkyl ester. Catalysts such as acids and bases can be added to aid the in situ conversion in adhesives. Illustrative of such methacrylate esters are methyl methacrylate, ethyl methacrylate, sec-butyl methacrylate, t-butyl methacrylate, i-amyl methacrylate, hexyl methacrylate, decyl methacrylate and dodecyl methacrylate. Largely because of ease of polymerization, the preferred alkyl methacrylates are branched-butyl methacrylates, i.e., iso-butyl methacrylate and t-butyl methacrylate. The desired poly(alkyl methacrylate) block is produced by directly polymerizing the corresponding alkyl methacrylate monomer or alternatively the desired block is obtained by polymerizing a more easily polymerizable methacrylate and subsequently transesterifying the product to introduce the desired alkyl group. Tertiary butyl methacrylate (TBMA) is preferred because of ease of purification and polymerization.

The present invention works with both unhydrogenated and hydrogenated polymers. Hydrogenated ones are useful in certain circumstances. While unhydrogenated diene polymers have a number of outstanding technical advantages, one of their principal limitations lies in their sensitivity to oxidation. This can be minimized by hydrogenating the copolymers, especially in the diene blocks. The hydrogenation of these polymers and copolymers may be carried out by a variety of well established processes including hydrogenation in the presence of such catalysts as Raney Nickel, noble metals such as platinum, palladium and the like and soluhle transition metal catalysts. Titanium biscyclopentadienyl catalysts may also be used as described in U.S. Pat. No. 5,039,755, which is herein incorporated by reference. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. 3,113,986, 4,226,952 and U.S. Pat. Re. No. 27,145, the disclosures of which are herein incorporated by reference. The polymers are hydrogenated in such a manner as to produce hydrogenated polymers having a residual unsaturation content in the polydiene block of less than about 20%, and preferably as close to zero percent as possible, of their original unsaturation content prior to hydrogenation.

The molecular weights of these polymers may range from 1,000 to 1,000,000, preferably from 40,000 to 200,000. The vinyl aromatic hydrocarbon block molecular weight generally ranges from 4,000 to 30,000 and the conjugated diolefin block molecular weight generally ranges from 20,000 to 175,000. The molecular weight of the acrylic monomer block should be in the range from 100 to 30,000 because 100 represents the molecular weight of one unit and molecular weights greater than 30,000 can form a separate phase apart from the rubber.

The acrylic monomer content of the polymer is generally no more than about 3% but acrylic monomer contents of up to 70% are possible. Generally, the acrylic monomer may be present in the polymer in an amount from about 1% to about 15% because lower amounts will not provide the advantages of the present invention and higher amounts are not advantageous from a cost standpoint. All percentages expressed above are weight percentages based on the total weight of the block copolymer.

It is essential to the performance of the present invention that the block copolymers used herein have sufficient acrylic monomer to provide sufficient polar-type functionality to provide enhanced adhesion to polar surfaces relative to block polymers of conjugated dienes and/or vinyl aromatic hydrocarbons which do not contain such acrylic monomers in the polymer backbone. It is theorized that the presence of sufficient amounts of acrylic monomer in the polymer backbone increases the adhesion to polar surfaces by forming dipolar interactions between the polymer molecule and the surface.

It is necessary to add an adhesion promoting or tackifying resin that is compatible with the elastomeric isoprene block. A common tackifying resin is a diene-olefin copolymer of piperylene and 2-methyl-2-butene having a softening point of about 95° C. This resin is available commercially under the tradename Wingtack 95 and is prepared by the cationic polymerization of 60% piperylene, 10% isoprene, 5% cyclopentadiene, 15% 2-methyl-2-butene and about 10% dimer, as taught in U.S. Pat. No. 3,577,398 incorporated by reference. Other tackifying resins of the same general type may be employed in which the resinous copolymer comprises 20–80 weight percent of piperylene and 80–20 weight percent of 2-methyl-2-butene. The resins normally have softening points (ring and ball) between about 80° C. and about 115° C. Hydrogenated resins may be used to advantage if there is a need to keep the level of unsaturation low.

Other adhesion promoting resins which are also useful in the compositions of this invention include hydrogenated rosins, esters of rosins, polyterpenes, terpene-phenol resins and polymerized mixed olefins. To obtain good themo-oxidative and color stability, it is preferred that the tackifying resin be a saturated resin, e.g., a hydrogenated dicyclopentadiene resin such as Escorez ® 5000 series resin made by Exxon or a hydrogenated polystyrene or polyalphamethylstyrene resin such as Regalrez ® resin made by Hercules.

The amount of adhesion promoting resin employed varies from 20 to 400 parts by weight per hundred parts rubber (phr), preferably between 100 to 350 phr. The rubber referred to herein is the polymer used in the adhesive composition. The polymers may also contain from 10 to 60 weight percent of A-B diblock polymer to promote adhesion.

The selection of the particular tackifying agent is, in large part, dependent upon the specific block copolymer employed in the respective adhesive composition. In the manufacture of disposable articles such as diapers, sanitary napkins and bed pads, there is the additional consideration of having a substantially white or clear adhesive composition.

The adhesive composition of the instant invention may contain plasticizers, such as rubber extending plasticizers, or compounding oils or liquid resins. Rubber compounding oils are well-known in the art and include both high saturates content oils and high aromatics content oils. Preferred plasticizers are highly saturated oils, e.g. Tufflo ® 6056 oil made by Arco. The amounts of rubber compounding oil employed in the invention composition can vary from 0 to 100 phr, and preferably between 0 to 60 phr.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the adhesive composition.

Additional stabilizers known in the art may also be incorporated into the adhesive composition. These may be for protection during the life of the disposable article against, for example, oxygen, ozone and ultraviolet radiation. However, these additional stabilizers should be compatible with the essential stabilizers mentioned herein-above and their intended function as taught herein.

The adhesive compositions of the present invention are typically prepared by blending the components at an elevated temperature, preferably between 130° C. and 200° C., until a homogenous blend is obtained, usually less than three (3) hours. Various methods of blending are known to the art and any method that produces a homogenous blend is satisfactory.

The resultant adhesives may then preferably be used in a wide variety of product assembly applications. Examples include tapes, labels, diapers, sanitary napkins and decals. Tapes, labels and decals utilize a printable backing material, such as paper or plastic, upon which the adhesive is coated.

The hot melt adhesives of the present invention are useful as pressure sensitive adhesives, especially where adhesion to polar surfaces is desirable. Tape applications and label applications are examples of uses for pressure sensitive adhesives. Pressure sensitive adhesives are simply adhesives which can form a measurable bond to a surface at reasonable pressures, such as pressures normally expected by pressing one's finger on the adhesive backing. The hot melt adhesives of the present invention are also useful as hot-melt assembly adhesives which are adhesives which bond well to surfaces when hot, but which have little bonding capability at room temperature. Further, the compositions are useful in mastics which are solvent-based pastelike adhesives. These compositions should be useful in repulpable adhesives which are adhesives compatible with processes employed in recycling paper, principally because these polymers in the adhesive compositions should provide more water dispersibility due to the acrylic monomer functionality. The polymers are useful in contact adhesives which are coated on two surfaces, allowed to dry and pressed together to form a bond. They are useful in flexible packaging laminating adhesives.

Methacrylate-containing block copolymers may also be useful in hot melt adhesives by providing chemical functionality which can be utilized to accomplish crosslinking reactions between polymer chains. These crosslinking reactions are potentially useful in producing adhesives capable of performing at temperatures above 100° C. Conventional styrenic block copolymer-based adhesives are limited to applications at less than 100° C. due to the softening of styrenic domains. Crosslinking reactions can be accomplished with the methacrylic acid or methacrylic anhydride functional forms by using a melamine type crosslinking agent such as a Cymel ® resin. Other crosslinkers include diols, diamines and di-isocyanates.

A particular problem in crosslinking hot melt adhesives has been limited "pot life" stability. The polymers of the present invention offer a way to overcome this deficiency by utilizing the kinetics of the tertiary butyl methacrylate (ester) to methacrylic acid or anhydride transition to retard crosslinking until the system is coated. Crosslinkers such as those mentioned above will be inert with the methacrylate ester. Crosslinking of CBC, CABC, CABAC or coupled $(BC)_nX$ polymers can give adhesives with enhanced holding power and performance at high temperatures.

Also, these compositions are useful in formulating sealants with improved adhesion to polar surfaces, and may be used in hot melt form or applied through the use of a solvent. These polymers are also useful in general solvent-based coatings and graphic arts industries with applications in several systems (i.e. epoxies, urethanes and polyesters). They also are useful in specific novel applications including marine and maintenance coatings, coil coatings, automotive and automotive refinish coatings, packaging inks, overprint coatings, wood coatings, floor coatings, wall coatings and removable or strippable coatings. These coatings may include fillers, gloss improvers, pigments and stabilizers as ingredients in addition to the polymer. Suitable solvents for all of these solvent systems include the organics such as toluene, xylene, cyclohexane, etc.

In the following examples, the percent TBMA was determined by nuclear magnetic resonance spectroscopy. The melt viscosity was measured in centipoise (cps) by using a Brookfield Themocell viscometer at 350° F. The SAFT (M) Mylar was measured by 1"×1" Mylar to Mylar lap joint with a 1 kg weight. The SAFT (K) Kraft was measured by 1"×1" Mylar to Kraft paper lap joint with a 1 kg weight. SAFT measures the temperature at which the lap shear assembly fails under load. The molecular weights were determined by gel permeation chromatography as the peak molecular weight of the main species. The polystyrene content was determined by nuclear magnetic resonance spectroscopy. Rolling Ball (RB) Tack is the distance a steel ball rolls on the adhesive film with a standard initial velocity. Small numbers indicate aggressive tack. Holding Power is the time required to pull a standard area (½in.×½in.) of tape from a standard test surface, steel (S) or Kraft paper (K), under a standard load, in shear at 2° antipeel (Pressure Sensitive Tape Council Method No. 7). Peel was determined by PSTC Test No. 1. Polyken probe tack was determined by ASTM D-2979. Loop tack was determined using TLMI loop tack tester.

EXAMPLE 1

In this example, the adhesive properties of hot melt adhesives made with two different polymers are contrasted. Two different adhesive formulations were made with each of the polymers, one containing 45% polymer and the other containing 35% polymer. The prior art polymer is a linear styrene-isoprene-styrene block copolymer having a molecular weight of 160,000 and a styrene content of 15%. This polymer was 82% coupled meaning that 82% of the polymer was the triblock and the other 18% of the polymer was styreneisoprene diblock. The polymer of the present invention was a styrene-isoprene-styrene-TBMA block copolymer which is essentially the same polymer as the tri-block component of the prior art polymer with a block of TBMA of 5,000 molecular weight on one end. The TBMA polymer was 26% coupled meaning that 26% of the polymer is dimerized by a tert-butylmethacrylate group resulting in S-I-S-(TBMA)-S-I-S.

The polymers were formulated into hot melt adhesive formulations by adding the tackifying resin, Piccotac ® 95, a synthetic $C_5$ resin made by Hercules, and Shellflex ® 371 oil, a napthenic/parafinnic oil made by Shell Oil Company, to the polymer and blending the ingredients together by mixing in toluene solution. As stated above, the first formulations contained 45% polymer by weight, 48% Piccotac ®95 resin and 7% oil. The second set of formulations contained 35% polymer by weight, 49% Piccotac ® 95 resin and 16% oil. The polymer used in formulations including the TBMA polymers are mixtures of 80% of the total polymer content of S-I-S-T and 20% of a 15% styrene content S-I di-block having a molecular weight of 80,000. The di-block improves pressure sensitive tack values in these formulations. The adhesive characteristics of the two sets of formulations are shown in Table 1.

TABLE 1

| | 80% S-I-S-T + 20% Di-block | | Prior Art Polymer | |
|---|---|---|---|---|
| Polymer Content | 45% | 35% | 45% | 35% |
| RB Tack (cm) | 6.2 | 4.5 | 1.1 | 0.9 |
| Polyken (g) | 1300 | 1200 | 1640 | 1650 |
| Loop Tack (oz/in) | 106 | 96 | 77 | 80 |
| 180° Peel (pli) | 4.5 | 5.7 | 4.8 | 4.3 |
| HPS (min) | 1520 | 304 | 543 | 56 |
| HPK (min) | 18 | 20 | 706 | 28 |
| SAFT (M) (°C.) | 84 | 73 | 93 | 79 |
| SAFT (K) (°C.) | 65 | 62 | 77 | 58 |
| Visc (cp) | 137,000 | 21,000 | 88,000 | 19,000 |
| Tg midblk (°C.) | −20 | −20 | −20 | −20 |

TBMA polymer is 26% coupled.

It can be seen that the initial holding power to steel of the formulations of the present invention are much higher than the holding power to steel of the formulation using the polymer of the prior art. The other results demonstrate that a reasonably well balanced set of pressure sensitive adhesive properties can be obtained in formulations incorporating S-I-S-T polymers with di-block. The improved holding power to steel was not obtained at the expense of a substantial loss of tack. RB Tack, Polyken Probe Tack, Loop Tack, and 180° Peel values are comparable to the prior art polymer.

EXAMPLE 2

In this experiment, the polymers used in Example 1 were again contrasted in an adhesive formulation. However, in this test, adhesive peel values were measured from various surfaces; surfaces containing polar functionality (steel and glass) and a pure hydrocarbon surface (polyethylene). The adhesive formulation contained 40% polymer, 53% PICCOTAC ® 95 resin and 7% SHELLFLEX ® 371 oil. The results are shown in Table 2 below.

TABLE 2

| 180° Peel Values After 1 Day | | | | | |
|---|---|---|---|---|---|
| S-I-S-T + 20% Di-Block | | | Prior Art Polymer | | |
| Steel | Glass | Polyethyl. | Steel | Glass | Poly |

TABLE 2-continued

| | | | | | |
|---|---|---|---|---|---|
| 9.0[c] | 9.3[c] | 3.4[a] | 5.6[a] | 3.9[a] | 2.9[a] |

[a]adhesive failure
[c]cohesive failure

It can be seen that adhesives containing methacrylate block copolymer adhere more strongly to surfaces containing polar functional groups. In fact the methacrylate-containing polymers adhere so strongly to glass and steel, the adhesive internally fails at a force less than that required to remove the adhesive from the surface. Methacrylate block copolymers do not adhere strongly to non-polar surfaces such as polyethylene and show adhesive failure to the surface.

Adhesives formulated with the prior art polymer (S-I-S) show less adhesion to steel and glass than adhesives prepared with the methacrylate block copolymers. Cohesive failure of adhesive was not observed with the prior art polymer on any of the test surfaces.

EXAMPLE 3

In this experiment, the adhesive of Example 2 is compared to a similar adhesive formulated with the described prior art polymer. Samples of adhesive-coated tape were bonded to steel, glass and polyethylene panels while hot, similar to the bonding process employed with hot melt assembly adhesives. The bonding was performed at 85° C. for 30 seconds at a pressure of 20 pounds per square inch.

TABLE III

| 180° Peels (lb/in) Samples Bonded at 180° F. for 30 sec at 20 psi | Steel | Glass | Polyethyl. |
|---|---|---|---|
| 80% S-I-S-T + 20% Diblock | 8.7[c] | 9.3[c] | 2.7[a] |
| S-I-S Prior Art | 4.4[a] | 4.2[a] | 2.6[a] |

[c]indicates cohesive failure. The bond to the surface is stronger than the internal cohesive strength of the adhesive.
[a]adhesive failure to the surface.

It is seen that for the adhesive containing the S-I-S-T with di-block, high adhesion values are measured for 180° Peels from steel and glass, but not from polyethylene. Heating adhesive formulated with the prior art polymer does not give high, cohesively failing, peel values to steel and glass.

I claim:

1. A hot melt adhesive composition comprising a tackifying resin and a block comprising at least one conjugated diolefin block having a molecular weight from 20,000 to 175,000, at least one vinyl aromatic hydrocarbon block having a molecular weight from 4,000 to 30,000 and at least one acrylic monomer block having a molecular weight from 100 to 30,000 with the structure

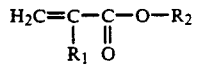

wherein $R_1$ is selected from the group consisting of hydrogen, phenyl and alkyl radicals which are linear or branched and contain from 1 to 10 carbon atoms, and $R_2$ is a cyclic or non-cyclic alkyl radical which is branched at the first carbon atom, contains from 1 to 14 carbon atoms and may contain a tertiary amine or an ether linkage.

2. The composition of claim 1 wherein the tackifying resin comprises from about 10 parts to about 400 parts by weight per 100 parts rubber.

3. The composition of claim 1 wherein the acrylic monomer block is derivatized and is selected from the group consisting of polyacrylic acids, polyacrylic anhydrides, unconverted ester functional forms and mixtures thereof.

4. The composition of claim 1 wherein the polymer is selectively hydrogenated.

5. An assembly adhesive composition comprising the composition of claim 1.

6. A mastic comprising the composition of claim 1 and a solvent.

7. A sealant composition comprising the composition of claim 1 and a solvent.

8. A coating composition comprising the composition of claim 1 and a solvent.

9. A high temperature pressure sensitive adhesive made with the composition of claim 1 and a suitable crosslinking agent.

10. The composition of claim 1 which additionally comprises from 10 to 60 weight % of a diblock of the vinyl aromatic hydrocarbon and the conjugated diolefin.

11. The composition of claim 1 wherein the acrylic monomer is an alkyl methacrylate.

12. The composition of claim 11 wherein the alkyl methacrylate is tertiary butyl methacrylate.

13. A pressure sensitive made with the composition of claim 1.

14. A tape comprising the composition of claim 13 and a backing material.

15. A label comprising the composition of claim 13 and a backing material.

16. The composition of claim wherein the polymer is a linear A-B-A-acrylic monomer block copolymer wherein A is a vinyl aromatic hydrocarbon and B is a conjugated diene.

17. The composition of claim 16 which additionally comprises 15 to 50 weight % of a coupled A-B-A-acrylic monomer-A-B-A block copolymer.

18. The composition of claim 16 wherein A is styrene and B is isoprene.

19. The composition of claim 18 wherein the acrylic monomer is an alkyl methacrylate.

20. The composition of claim 19 wherein the alkyl methacrylate is tertiary butyl methacrylate.

* * * * *